United States Patent [19]

Wilchek et al.

[11] Patent Number: 4,894,468

[45] Date of Patent: Jan. 16, 1990

[54] SUBSTITUTED SILICA

[75] Inventors: Meir Wilchek; Karin Cabrera, both of Rehovot, Israel

[73] Assignee: Yeda Research and Development Co., Ltd., Rehovot, Israel

[21] Appl. No.: 44,475

[22] Filed: May 1, 1987

[30] Foreign Application Priority Data

Apr. 27, 1986 [IL] Israel ........................................ 78678

[51] Int. Cl.$^4$ ............................................... C07F 7/08
[52] U.S. Cl. .................... 556/416; 556/400; 556/422; 556/427; 556/428; 556/437; 556/450; 548/110; 548/406; 530/300; 530/344; 530/350; 530/417
[58] Field of Search ............... 556/400, 428, 416, 437, 556/427, 422, 450; 548/110, 406; 530/300, 344, 350, 417

[56] References Cited

U.S. PATENT DOCUMENTS 4,788,909 10/1988 Karger et al. ...................... 556/450

Primary Examiner—Paul F. Shaver
Attorney, Agent, or Firm—Browdy and Neimark

[57] ABSTRACT

The invention relates to modified silica, substituted with a variety of substituents. There is provided a product termed primary hydroxyl silica where there are attached to the silica substituents bearing a single hydroxyl group. Furthermore there are provided a wide variety of derivatives of such hydroxy-silica, which are of value in affinity chromatography and for various other uses. The products combine the thermal and mechanical stability of the silica used as carrier with the useful properties of the substituents.

10 Claims, No Drawings

SUBSTITUTED SILICA

FIELD OF THE INVENTION

There are provided novel derivatives of chemically modified silica. On the one hand there is provided modified silica termed "primary hydroxyl silica" where the silica is substituted by substituent groups having a single hydroxyl group; on the other hand there are provided derivatives of such primary hydroxyl silica, obtained by the activation of same with a suitable activating agent, such as a chloroformate, a carbodiimidazole, a cyanobromide, a sulfonylchloride or the like. The novel derivatives are of value in organic chemistry. They are of special value in high and low pressure affinity chromatography, in protein immobilization; they are of value as stationary phases in HPLC and the like.

Other and further features of the invention will become apparent hereinafter.

BACKGROUND OF THE INVENTION

A wide variety of materials has been used in affinity chromatography as carrier. The most widely used is beaded agarose which is activated with cyanobromide (CNBr). Although quite stable in aqueous solutions, its thermal and mechanical stability is not adequate for a variety of purposes, such as HPAC. The cyanobromide activation has the disadvantage that coupling of amines results in the formation of N-substituted isourea bonds which lack adequate stability. Such instability results in the leakage of ligands and after some time columns of such material acquire ion exchange properties which interfere with the biospecificity.

Silica, which has adequate mechanical stability and permanent porosity, has been considered to be unsuitable as support due to the irreversible adsorption and denaturation of certain substrates by the silanol groups on its surface. This has prevented the use of silica as carrier in affinity chromatography and in similar uses. Regnier and Noel, J of Chromatographic Science 14 (1976) 216, have provided a modified silica providing glycerolpropylsilane bonded phases. These are of a thickness of about 18–19 Å, with the glycerol moiety varying from 80 to 150 μmoles/g.

The substrate used was controlled porosity glass, and the modification decreased nonspecific adsorption and denaturation of proteins. The modified silica of Regnier et al., has two adjacent carbons, each bearing a hydroxy group, and activation is likely to lead to the formation of undesired inactive cyclic carbonate derivatives. This drawback is overcome to a large extent by the present invention.

SUMMARY OF THE INVENTION

According to the present invention there is provided silica substituted by substituents bearing a single primary hydroxy group, and there are provided activated derivatives of such modified silica. There are provided carriers for use in high pressure affinity chromatography (HPAC) and low pressure affinity chromatograhy (LPAC), for protein immobilization and for similar uses which are modified silica defined above. There is also provided a process for the production of primary hydroxyl silica and for the preparation of activated derivatives thereof. The reaction sequence leading to primary hydroyl silica is set out in Reaction Scheme 1: in this scheme (2) is the diol obtained by Regnier, which has the drawbacks set out above. Reaction step 3 leading to aldehyde silica was done according to Borchert, Larsson and Mosbach, J. of Chromatography 244 (1982) 49–56; reaction step 4 leading to the desired product, is novel and part of the invention. The resulting product (4) can be easily activated by conventional activating agents, such as chlorformates (nitrophenylchloroformate, N-hydroxysuccinimide chloroformate), by means of carbodiimidazole, 1,1,1-trichloro-2-monochloroethylsuccinimide carbonate, or by a sulfonylchloride, which provide stable covalent links.

The high surface area and small particle size of silica particles, their mechanical stability and other advantageous properties of silica make it a highly satisfactory support binding large quantities of ligands as is demohstrated hereinafter. The novel products make possible fast affinity chromatography on a preparative scale by using larger particle size silica in low pressure columns. Some examples of activation are illustrated in Reaction Scheme 2, which also illustrates the covalent attachment of proteins to such resulting activated modified silica. The activated modified silica according to the present invention is highly effective for the coupling of low molecular weight ligands as well as for the bonding of macromolecules (biologically active ones) having terminal amino groups, such as enzymes, BSA, polyclonal and monoclonal antibodies, antigens etc., A further modification of the present invention comprises such modified silica, where the substituent moiety comprises a suitable spacer of the —NH—(CH$_2$)$_n$—NH— or —HN—(CH$_2$)$_n$—COO—type which provides a larger distance of the bound molecule from the silica substrate.

The following examples are of an illustrative nature only, and it is clear that the "primary hydroxyl silica" of the present invention can be activated and used for the bonding of biologically active, and other molecules of types different from those specifically exemplified. Thus, the invention relates to compounds of the following formula, and to their production, as well as to the use of these for the purposes indicated above, and for similar applications:

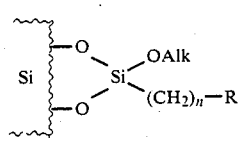

wherein:

Si is silica;

Alk is lower than alkyl, and where:

a. the compound is a primary hydroxy silica compound, wherein R is hydroxyl or R is —(CH$_2$)$_n$—O—(CH$_2$)$_m$—CH$_2$—OH, b. a derivative thereof wherein:

R is —O—(CH$_2$)$_m$—R$^1$—OR$^2$,

R$^1$ is a group selected from: —CH$_2$—, —O—CH$_2$—, —O—CH$_2$—CH$_2$—, —O—C—CH—CH$_2$—S—(CH$_2$)$_p$—

R$^2$ is selected from: hydrogen, —CN, —SO$_2$CH$_2$—CF$_3$,

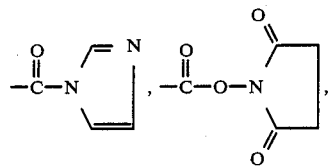
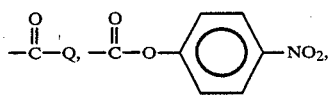

where Q is a group selected from $-HN-(CH_2)_n-NH_2$, $-HN-(CH_2)_n-COOH$, $-HN-$peptide and $-HN-$protein, where n, m and p are small integers, where m may also be zero.

Reaction Scheme 1

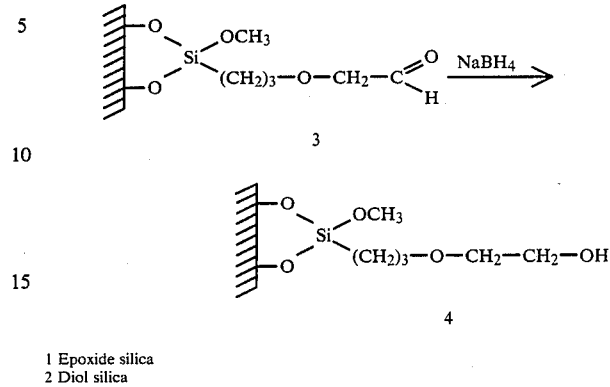

-continued
Reaction Scheme 1

1 Epoxide silica
2 Diol silica
3 Aldehyde silica
4 Primary hydroxyl silica

Reaction Scheme 2

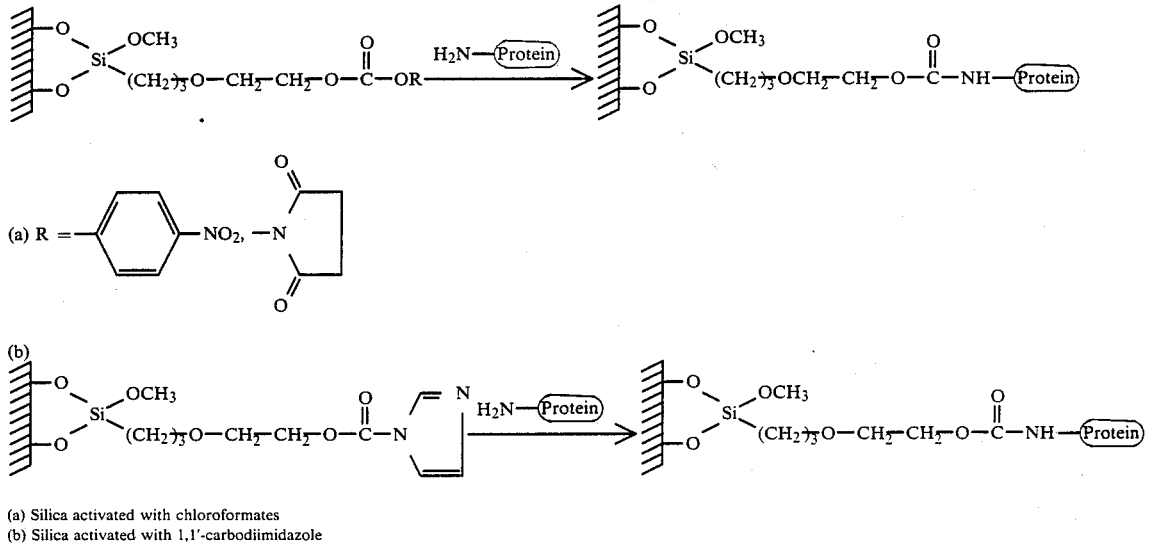

(a) Silica activated with chloroformates
(b) Silica activated with 1,1'-carbodiimidazole

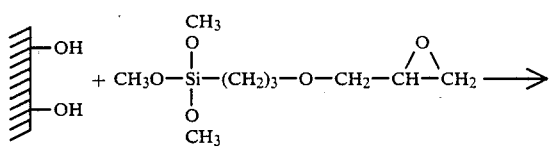

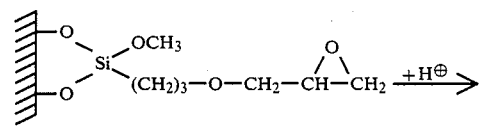

1

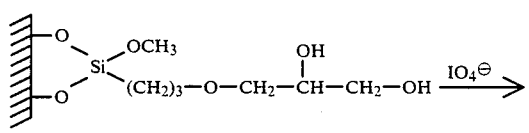

2

Commercially available silica is chemically modified by reacting with silanes as it is shown in Scheme 1. According to the present invention the resulting primary hydroxyl functions are activated with chloroformates or carbodiimidazole as demonstrated in Scheme 2. The thus obtained activated products show excellent behaviour towards the coupling of low molecular weight ligands as well as biological macromolecules like proteins having terminal $-NH_2$ groups. Among the proteins coupled, there may be mentioned enzymes (trypsin, chymotrypsin, etc.), BSA, antibodies (polyclonal and monoclonal) etc.

EXAMPLES

The following description is intended to illustrate the invention and to exemplify it. It is to be construed in a non-limitative manner.

1. Chemical modification of the silica leading to primary hydroxyl functions
   a. γ-glycidoxypropyltimethoxysilica (epoxide silica): 5 g silica (Partisil, 5 μm) were washed with 20% nitric acid, H₂O, 0.5 m NaCl, H₂O, acetone and ether and dried in a desiccator under vacuum. The washed silica was either kept in a drying pistol at 200° C. for 8 h or distributed on a plate and dried in a vacuum oven at 150° C. for 40 h in order to remove physically adsorbed water.

All glass equipment was dried before use at 100° C. The dried silica (5 g) was put in a three-necked reaction flask and slurried in 100 ml sodium dried toluene. A slow stream of dried N₂ (over H₂SO₄) was passed through the suspension during the time of reaction. 2 ml (9 mmol) γ-glycidoxypropyltrimethoxysilane and 70 μl (0.5 mmole) triethylamine (potassium hydroxide dried) were added under stirring. The reaction mixture was heated overnight (15 h) under reflux. The epoxide silica was washed on a sinter funnel with toluene, acetone, ether and dried under vacuum. The content of obtained epoxy groups was determined via titration to 320 μmole/g silica on average. Epoxide silica was treated with Na₂S₂O₃ and the liberated OH⁻ titrated with HCL.

b. Diol silica:

4.5 g expoxide silica were carefully suspended in 400 ml 0.01 m HCl and heated to 90° C. for 1 h under stirring.

c. Aldehyde silica:

4.5 g diol silica were slurried in 100 ml acetic acid/H₂O (10:90) and 4 g of NaIO₄ added. Reaction mixture was stirred for 2 h at room temperature. The formed aldehyde silica was washed with H₂O, acetone, ether and dried in a dessicator under vacuum.

The aldehyde content was qualitatively analysed as hydrazone derivative formed with 2.4-dinitrophenylhydrazine.

d. Primary Hydroxyl silica:

1 g aldehyde silica was suspended in 20 ml of 0.3 m (228 mg) NaBH₄ in sodium acetate buffer. The suspension (~pH:9) was stirred for 2 h before the silica was washed with water, acetone and ether and dried in a desiccator under vacuum. The quantitative reduction was controlled via the reaction with 2.4-dinitrophenylhydrazine. An absence of aldehyde groups was shown by getting white silica after treatment with 2.4-dinitrophenylhydrazine.

2. Activation of primary hydroxyl silica with chloroformates and carbodiimidazole:

e. and f. Activation of primary hydroxyl silica with chloroformates:

1 g primary hydroxyl silica was suspended in 15 ml dry acetone (over K₂CO₃) and cooled in an ice bath to 4° C. After addition of 10 mmole p-nitrophenylchloroformate of N-hydroxysuccinimidechloroformate a solution of 15 mmole 4-dimethyl aminopyridine in 10 ml dry acetone was added dropwise to the suspension and left stirring for 30 minutes.

The activated silica was washed on a sinter funnel with acetone, 5% acetic acid in dioxane, methanol and ether. To ensure complete removal of reagents the methanol washings were checked for the presence of p-nitrophenol or N-hydroxysuccinimide by diluting an aliquot with 1 ml of 0.2N NH₄OH and reading the absorbance at 400 nm or 260 nm respectively.

Determination of active groups on the carrier: The amount of active groups on the p-nitrophenyl derivatives of the primary hydroxyl silica was determined by basic hydrolysis of a weight sample with 0.2N NaOH for 10 minutes at room temperature. The released p-nitrophenol was assayed spectrophotometrically at 400 nm E:17000. The amount of active groups present on the N-hydroxysuccinimide derivative of the primary hydroxyl silica was assayed after basic hydrolysis in 0.2N NH₄OH (10 minutes at room temperature) and assayed spectrophotochemically at 260 nm, E:9700.

g. Activation of primary hydroxyl silica with 1,1'-carbodiimidazole:

To a suspension of 0.7 g hydroxyl silica in 10 ml dry dioxane 0.35 g (2 mmole) 1,1'-carbodiimidazole were added and gently shaken for 30 minutes at room temperature, and followed as set out above.

h. 1,1,1-trichloro-2-monochloroethylsuccinimide carbonate:

Primary hydroxyl silica (150 mg) and 1,1,1-trichloro-2-monochloroethylsuccinimide carbonate (1.5 mmol) were suspended in 5 ml dry acetone. While the mixture was cooled and stirred in an ice bath, 2 mmol 4-dimethylaminopyridine dissolved in 5 ml dry acetone were added dropwise. Washing of the silica was performed as described above.

i. 1,1'-carbodiimidazole:

Activation with 1,1'-carbodiimidazole[3] was carried out by preparing a suspension of 150 mg silica and 1.5 mmol 1,1'-carbodiimidazole in 5 ml dry dioxane. The reaction mixture was stirred for 30 min at room temperature. Washing of the silica was performed with dioxane, acetone and ether.

j. Tosylchloride[8]:

For the preparation of tosylated silica, 150 mg silica and 1.5 mmol p-toluenesulfonylchloride were suspended in 5 ml dry acetone. After addition of 5 mmol pyridine, the reaction was continued for 1 h at room temperature under continuous stirring. The silica was washed according to the procedure described above.

k. Determination of active groups on the silica

The amount of active groups on the silica activated with chloroformates and 1,1,1-trichloro-2-monochloroethylsuccinimide carbonate was determined spectrophotometrically after basic hydrolysis as described earlier[7]. The amount of imidazolyl- and tosyl groups was determined by elementary analysis.

3. Coupling of ligands to the activated carrier:

I. 1 g activated with p-nitrophenylchloroformate, N-hydroxysuccinimidechloroformate or 1,1'-carbodiimidazole were suspended in 10 ml phosphate buffer (pH:7.5). After adding 50 mg protein or lysine, or ε-amino caproic acid or diaminohexane or any other amino containing ligand, the resulting mixture was gently shaken for 2 days at 4° C. The obtained silica was then washed with 0.1 m NaCl and water. (Table IV).

II. Coupling of ligands to prepacked activated columns

A stainless steel column (40×4.6 mm) was filled with about 0.5 g N-hydroxysuccinimide chloroformate-activated silica. A solution of 29 mg BPTI in 10 ml H₂O was pumped for 7 hours in a dynamic recycling process through the column. The optical density of the ligand solution was measured during the process of coupling to determine the amount of bound BPTI. For this experiment N-hydroxysuccinimide-activated silica was used instead of the p-nitrophenyl carbonate, since the amount of protein coupled could be followed directly by UV-absorption. In order to remove excess of active groups, 30 ml of 0.2N NH₄OH was pumped for 30 min through the column.

4. Determination of coupled protein:

The amount of bound protein on the carrier was either determined with amino acid analysis after hydrolysis of a weighed sample with 6N HCl at 110° C. or assayed by determining the unbound protein based on A 280 nm. Therefore the filtrate of the p-nitrophenyl-chloroformate activated resin was put to dialysis to remove the leaving groups or in the case of the N-hydroxysuccinimide activation the first unbound washing was diluted with HCl or acetic acid. (Table IV.)

5. Preparation of a high pressure column: Purification of Trypsin Inhibitor:

0.5 g silica to which trypsin was bound was slurry packed in a stainless steel column (4.5 mm, 4 cm) at a pressure of 3000 psi. The column was loaded with trypsin inhibitor using a 0.01 m phosphate buffer, pH 7.0 as mobile phase in the beginning. After changing the mobile phase to 0.025N HCl (pH 2.4) the trypsin inhibitor was eluted within 9.5 minutes using a flow rate of 0.5 ml/min.

6. Preparation of a high pressure column: Purification of Antiboides to BSA:

16 mg BSA were coupled to 0.5 g silica and slurry packed in a stainless steel column (4.5 mm, 4 cm) at a pressure of 2500 psi. We were able to isolate 1.28 mg pure antibody from 500 μl serum containing antibodies to DNP-BSA (dinitrophenol bound to BSA) using a 0.01 m phosphate buffer, pH 7.0 to load the sample and 0.1 m glycine HCl. pH 2.6 to elute the antibodies.

TABLE I
CHARACTERIZATION OF SILICAS MODIFIED WITH DIFFERENT SILANES

| Silica | Particle size (μm) | Pore size (Å) | Silane surface modifier* | Ligand density (μmol/g) | Activated groups** (μmol/g) |
|---|---|---|---|---|---|
| Partisil 5 | 5 | 60 | GPS | 360 | 255 |
| Lichrosorb Si 60 | 10 | 60 | GPS | 380 | 281 |
| Lichrosorb Si 60 | 10 | 60 | MPS | 710 | 123 |
| Lichrosorb Si 100 | 10 | 100 | APS | 900 | 437*** 223**** |
| Kieselgel 60 | 40–63 | 60 | GPS | 450 | 261 |

*Silanes used as surace modifiers were:
GPS, 3-glycidoxypropyltrimethoxysilane;
MPS, 3-methacryloxypropyltrimethoxysilane;
APS, 3-aminopropyltriethoxysilane.
**Amount of activated groups was determined by activation with p-nitrophenyl chloroformate.
***Activation of amino functions on the silica surface.
****Activation of hydroxyl functions after diazotization of the amino silica.

TABLE II
ACTIVATION OF HYDROXYETHYLOXYPROPYL SILICA OF LICHROSORB Si 60 WITH DIFFERENT REAGENTS: DETERMINATION OF ACTIVE GROUPS AND COUPLED TRYPSIN

| Activating reagent | Activated groups (μmol/g) | Coupled trypsin (mg/g) |
|---|---|---|
| p-Nitrophenyl chloroformate | 282 | 50.5 |
| N—Hydroxysuccinimide chloroformate | 320 | 47.1 |
| 1,1,1-Trichloro-2-monochloroethyl-succinimide carbonate | 129 | 33.8 |
| 1,1'-Carbodiimidazole | 480 | 51.5 |
| p-Toluenesulfonylchloride | 363 | 14.6 |

TABLE III
INFLUENCE OF BASE ON THE DEGREE OF ACTIVATION USING p-NITROPHENYL CHLOROFORMATE AND HYDROXYETHYLOXYPROPYL SILICA OF KIESELGEL 60

| Base | Activated groups (μmol/g) |
|---|---|
| Triethylamlne | 130.6 |
| Pyridine | 217.6 |
| 4-Dimethylaminopyridine | 282.3 |

TABLE IV

| Amount of coupled protein using different activated silica | | |
|---|---|---|
| Activating reagent | Coupled protein BSA mg/l g silica | Coupled protein Trysin mg/lg silica |
| p-nitrophenylchloroformate | 15.2 | 49.1 |
| N—hydroxysuccinimide chloroformate | 15.3 | 53.1 |
| 1,1'-carbodiimidazole | 30.8 | 50.9 |

We claim:

1. A compound of the general formula

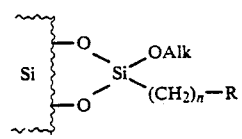

wherein:
Alk is lower alkyl and Si is silica, and where:
 a. the compound is a primary hydroxy silica compound, wherein R is hydroxyl or R is —(CH$_2$)$_n$—O—(CH$_2$)$_m$—CH$_2$—OH,
 b. a derivative thereof wherein:
R is —O—(CH$_2$)$_m$—R$^1$—OR$^2$,
R$^1$ is a group selected from:

—CH$_2$—, —O—CH$_2$—, —O—CH$_2$—CH$_2$—,

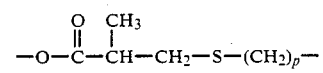

R$^2$ is selected from: hydrogen, —CN, —SO$_2$CH$_2$—CF$_3$,

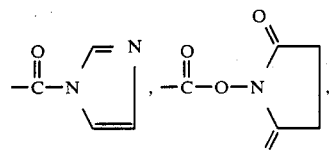

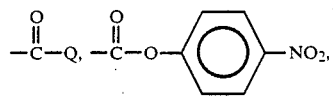

where Q is a group —HN—(CH$_2$)$_n$—NH$_2$, —HN—(CH$_2$)$_n$—COOH, —HN—peptide or —HN—protein, where n, m and p are small integers, where m may also be zero.

2. A compound according to claim 1, of the formula

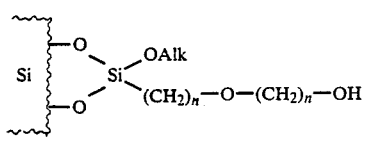

where Alk designates lower alkyl and where n is an integer from 1 to 5.

3. A compound according to clam 1, of the formula

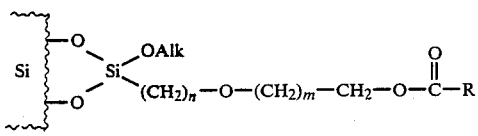

where R is

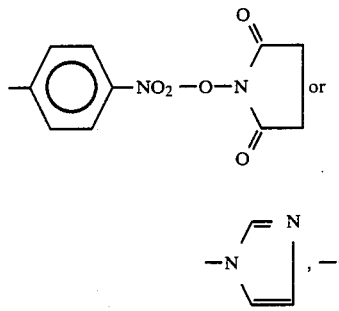

where m and n are each a small integer of from 1 to 5.

4. A compound according to claim 2 or 3, wherein there is provided in said molecule a spacer of the type —HN—(CH$_2$)$_n$—NH— or —HN—(CH$_2$)$_n$—CO—, where n is a small integer.

5. Modified silica according to claims 1 to 4, of irregular or spherical particle form, of a pore size in the range of from 3 μm and up to about 200 mm.

6. Modified silica according to claim 5, of particle size of 3 μm to 200 μm.

7. A process for the production of primary hydroxyl silica as claimed in claim 1, which comprises reacting an intermediate (2)

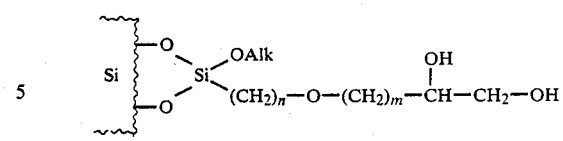

with a suitable oxidizing agent to provide an intermediate (3)

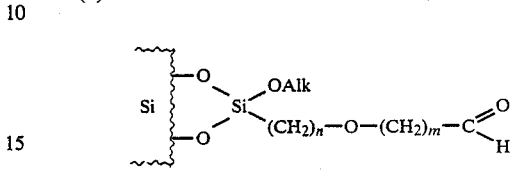

which is reacted with sodium borohydride (NaBH$_4$) to provide the desired compound (4),

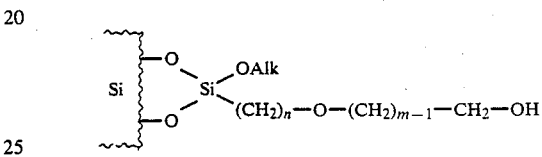

where m and n are as defined in claim 1.

8. A process according to claim 7, further comprising activating said compound (4) by reaction with a chloroformate or with a 1,1-carbodiimidazole, with tresylchloride, with 1,1,1-trichloro-2-monochloroethylsuccinimide carbonate, or by a sulfonylchloride or with cyanogen bromide.

9. A process according to claim 7 wherein the chloroformate is of the formula

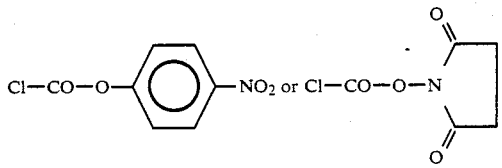

10. A process according to claim 7 where the diimide is of the formula

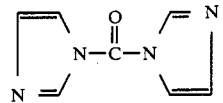

* * * * *